UNITED STATES PATENT OFFICE.

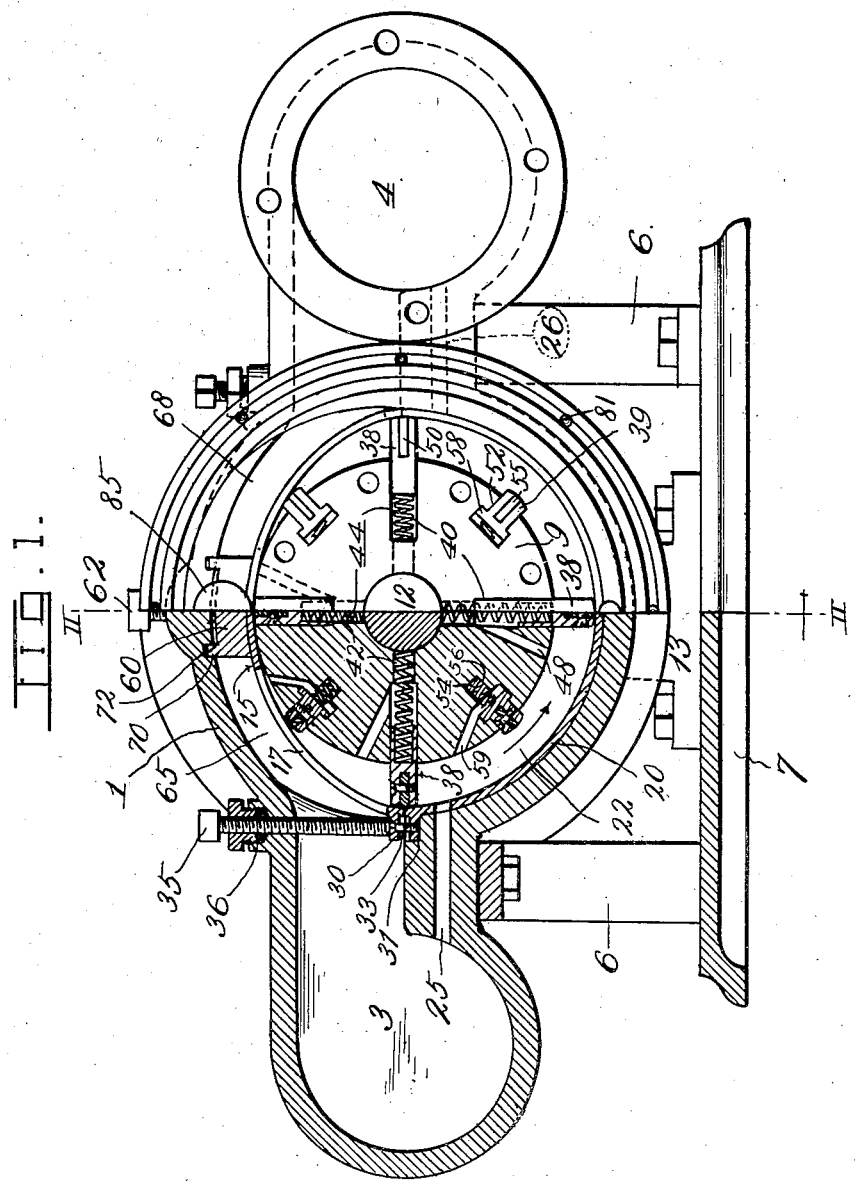

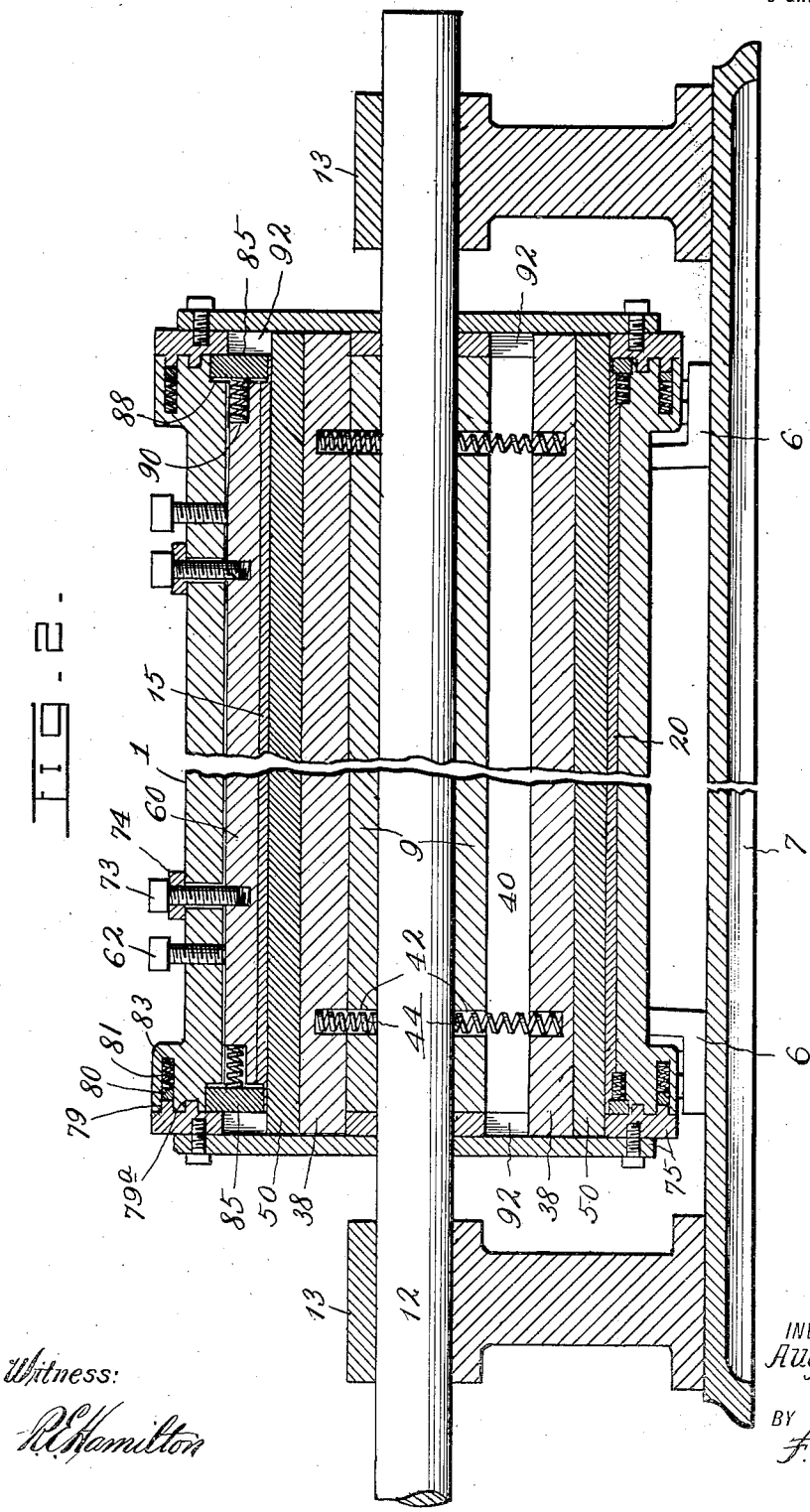

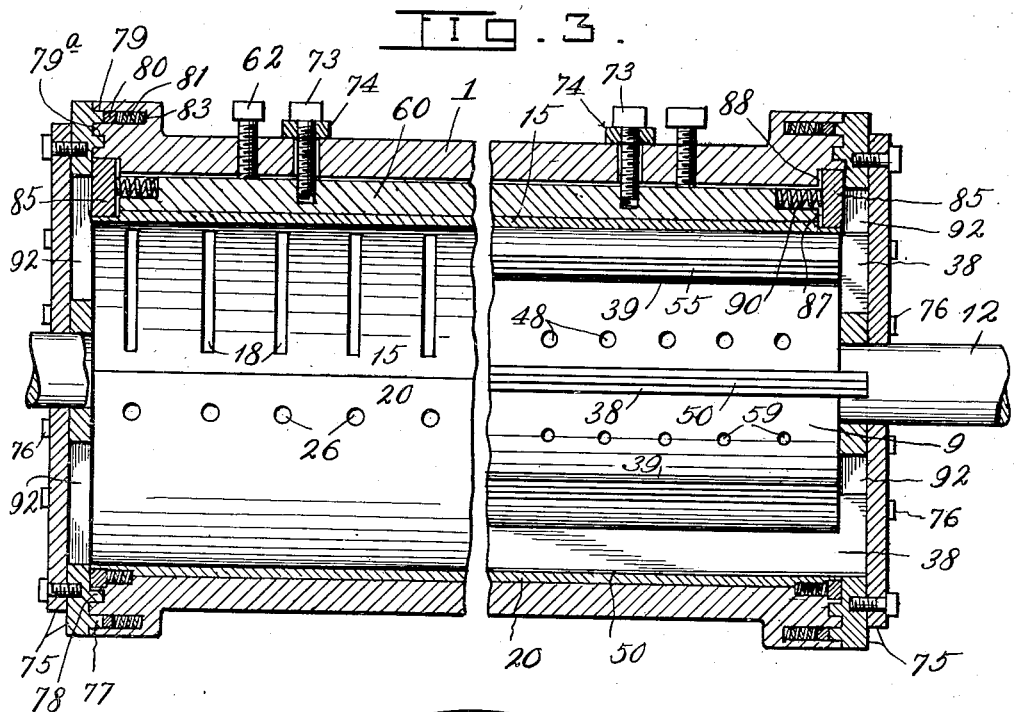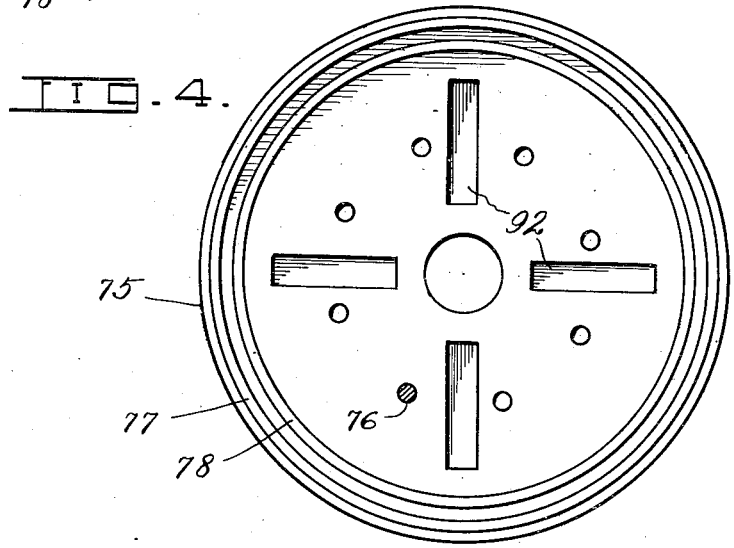

AUGUST BRAUER, OF INDEPENDENCE, MISSOURI, ASSIGNOR OF ONE-HALF TO G. P. A. WEISENBORN, OF KANSAS CITY, MISSOURI; CHARLOTTA BRAUER EXECUTRIX OF SAID AUGUST BRAUER, DECEASED.

ROTARY PUMP.

1,350,775.      Specification of Letters Patent.      Patented Aug. 24, 1920.

Application filed August 5, 1918. Serial No. 248,322.

*To all whom it may concern:*

Be it known that I, AUGUST BRAUER, a citizen of the United States, residing at Independence, in the county of Jackson and State of Missouri, invented certain new and useful Improvements in Rotary Pumps, of which the following is a specification.

My invention relates to improvements in rotary pumps and certain objects are to provide a simple and inexpensive pump of this character whereby maximum pumping capacity may be had at a minimum expenditure of power.

Other objects will hereinafter appear, and in order that the invention may be fully understood, reference will now be made to the accompanying drawings, in which:

Figure 1 is a combined section and side elevation of the pump with one of its cylinder-heads removed.

Fig. 2 is a broken, vertical section on line II—II of Fig. 1.

Fig. 3 is a broken, vertical section showing a portion of the interior mechanism in elevation and another portion removed.

Fig. 4 is a detail side elevation of one of the cylinder heads.

In carrying out the invention, I employ a cylinder 1 having inlet and outlet ducts 3 and 4, respectively, and mounted on supports 6 surmounting a base plate 7.

9 designates a rotor fixedly-mounted upon a shaft 12, extending centrally through the cylinder 1 and journaled in bearings 13 secured upon the base-plate 7.

15 designates a bushing arranged eccentrically to the rotor 9 and bearing against the upper central portion thereof to prevent the passage of water at that point. Said bushing 15 has oppositely-disposed ports 17 and 18 communicating with the inlet and outlet ducts 3 and 4, respectively.

20 designates a companion bushing arranged concentrically to the rotor 9 and spaced therefrom to leave a channel 22 for the flow of water from the inlet duct 3 to the outlet duct 4, with which it communicates through the ports 17 and 18, respectively. The channel 22 also communicates with the ducts 3 and 4 through ports 25 and 26, respectively, extending through the cylinder 1 and the bushing 20.

The bushings 15 and 20 are provided near their abutting edges with longitudinal flanges 30 and 31, respectively, removably-connected by screws 33. Set screws 35 bearing against the upper flanges 30 are provided to overcome any tendency of the bushings 15 and 20 to revolve with the rotor 9, which is provided with equally-spaced vanes 38 and deflectors 39. Stuffing boxes 36 at the upper portion of the cylinder 1 prevent leakage of water around the set screws 35 where they extend through said cylinder. If desired the bushings 15 and 20 may be formed integral with each other.

The vanes 38 are slidably-mounted in slots 40 extending longitudinally through the rotor 9 which is also provided with holes 42 to admit coil springs 44 bearing against the shaft 12 and said vanes 38 to hold the same in contact with the bushings 15 and 20 as the rotor 9 revolves.

The springs 44 are assisted in holding the vanes 38 in engagement with the bushings 15 and 20 by water admitted to the inner edges of said vanes through ducts 48 leading from the periphery of the rotor 9 to the inner edges of the slots 40. Water is prevented from leaking past the outer edges of the vanes 38 by strips of leather or other suitable packing 50, set in said vanes and arranged to bear against the inner faces of the bushings 15 and 20.

The deflectors 39 are smaller but of somewhat the same construction as the vanes 38 and are slidably-arranged in slots 52 extending longitudinally of the rotor 9, they being normally held outwardly to bear against the bushing 15, by coil springs 54 seated in counterbores 56 and pressing against the inner sides of said deflectors 39, which are provided with flanges 58 to limit their outward movement. The springs 54 are assisted in holding the deflectors 38 outwardly by water admitted to the inner sides of said deflectors through ports 59 in the rotor 9. The deflectors 39 are provided with longitudinal packing strips 55 to prevent passage of water between their outer edges and the upper portion of the bushing 15.

As a water-tight fit between the top of the rotor 9 and the under surface of the bushing 15 is desirable said bushing is made of metal having a certain amount of resiliency, so that when worn by the vanes 38, the deflectors 39 and the rotor 9, it may be forced downwardly into engagement with the top of the latter by suitable means such as a division block 60, interposed between the upper portion of the bushing 15 and the adjacent wall of the cylinder 1.

Set screws 62 threaded through the upper portion of the cylinder 1 and bearing upon the division block 60 serve to force the latter downwardly on top of the bushing 15. In addition to holding the upper portion of the bushing 15 in contact with the top of the rotor 9 the division block 60 also separates two channels 65 and 68 communicating with the inlet and outlet ducts 3 and 4, respectively. By thus separating the channels 65 and 68, all of the water entering the channel 65 is directed downwardly through the ports 17 and the channel 22, from which latter it is forced by the vanes 38 through the ports 18 and the outlet duct 4.

The division block 60 is provided at its two upper corners with longitudinal flanges 70, which project upwardly into corresponding grooves 72 in the cylinder 1 and prevent water from passing between the top of said division block 60 and the adjacent wall of the cylinder. Should any water find its way between the cylinder wall and the top of the division block 60, it is prevented from forcing the latter into undue frictional contact with the top of the rotor 9 by set screws 73, threaded into the division block, and nuts 74 resting upon the cylinder 1.

The ends of the cylinder 1 are closed by rotary piston heads 75 rigidly secured to the ends of the rotor 9 by suitable means, such as screws 76 in order to revolve with said rotor. Leakage of water between the ends of the cylinder 1 and the adjacent sides of the cylinder heads 75 is prevented by rings 77 and 78, arranged concentrically on the inner faces of said cylinder heads and projecting into corresponding grooves 79 and 79ª, in the ends of the cylinder 1.

Packing rings 80 seated in the cylinder ends and yieldingly-held against the rings 79 by springs 81, are also employed to overcome leakage between the cylinder ends and the cylinder heads 75. The springs 81 are seated in counterbores 83 in the cylinder ends.

Leakage between the ends of the division block 60 and the cylinder heads 75 is overcome by packing disks 85 seated in recesses 87 and 88 in said division block 60 and the ends of the cylinder 1, respectively. Coil springs 90 seated in the ends of the division block 60 and bearing against the disks 85 serve to hold the same in engagement with the inner faces of the cylinder heads 75.

Leakage between the ends of the vanes 38 and the cylinder heads 75 is practically overcome by having the ends of said vanes 38 operate in slots 92 radially arranged in the cylinder heads 75.

With the parts constructed and arranged as shown and described, it is obvious that when the rotor 9 is driven in the direction of the arrow Fig. 1, water will be sucked into the channel 22 through the inlet 3 and the ports 17 and 25, and expelled by the vanes 38 through the ports 18 and 26 and the outlet duct 4. As the outer edges of the vanes 38 and the deflectors 39 contact the bushing 15, they are forced inwardly thereby against the action of their respective springs 44 and 54 and expel the water in the slots 40 and 52 through the ports 48 and 59, respectively. As the deflectors 39 successively engage the bushing 15 they act as a barrier and prevent the water between them and the following vanes 38, from passing between said bushing 15 and the rotor 9.

While I have described the invention as a rotary pump, it is obvious that it may be employed to advantage as a rotary engine by admitting steam or other motive fluid to the inlet duct 3.

From the foregoing description, it will be understood that I have produced a machine possessing the advantages above pointed out, and while I have shown and described the preferred form of the invention I reserve the right to make such changes in the construction, combination and arrangement of parts as properly fall within the spirit and scope of the claims.

Having thus described my invention, what I claim and desire to secure by Letters Patent, is:

1. In a machine of the character described, a cylinder having inlet and outlet ducts, a journaled shaft extending through said cylinder, a rotor mounted upon said shaft, channels between said rotor and the interior of the cylinder and communicating with the inlet and outlet ducts, a bushing in the cylinder arranged eccentrically to the rotor and having inlet and outlet ports communicating with said channels, a companion bushing in the cylinder spaced from and arranged concentrically to the rotor, vanes slidable in the rotor and adapted to engage the inner surfaces of said bushings, and means extending through the cylinder to prevent the bushings from rotating.

2. In a machine of the character described, a cylinder having inlet and outlet ducts, a journaled shaft extending through said cylinder, a rotor mounted upon said shaft, channels between said rotor and the interior of the cylinder and communicating with the inlet and outlet ducts, a bushing in the cylinder arranged eccentrically to the rotor and having inlet and outlet ports communicating with said channels, vanes slidable in the rotor and arranged to engage the inner surface of said bushing, a division block bearing upon the bushing between two of the aforementioned channels, and packing members between the ends of said division block and the cylinder heads.

3. In a machine of the character described, a cylinder having inlet and outlet ducts, a journaled shaft extending through said cylinder, a rotor mounted upon said shaft, channels between said rotor and the interior of the cylinder and communicating with the inlet and outlet ducts, a bushing in the cylinder arranged eccentrically to the rotor and having inlet and outlet ports communicating with said channels, vanes slidable in the rotor and arranged to engage the inner surface of said bushing, a division block bearing upon the bushing between two of the aforementioned channels, packing members between the ends of said division block and the cylinder heads, and resilient means for forcing said packing members against the cylinder heads.

In testimony whereof I affix my signature, in the presence of two witnesses.

AUGUST BRAUER.

Witnesses:
THEO. A. WEISENBORN,
L. J. FISCHER.